(12) United States Patent
Ma et al.

(10) Patent No.: US 11,262,594 B2
(45) Date of Patent: Mar. 1, 2022

(54) HOLOGRAPHIC DISPLAY, HOLOGRAPHIC DISPLAY DEVICE AND DISPLAY METHOD THEREOF

(71) Applicants: Beijing BOE Optoelectronics Technology Co., Ltd., Beijing (CN); BOE Technology Group Co., Ltd., Beijing (CN)

(72) Inventors: Zhanshan Ma, Beijing (CN); Wenhong Tian, Beijing (CN); Hao Zhang, Beijing (CN); Lili Chen, Beijing (CN); Chao Zheng, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/834,398

(22) Filed: Mar. 30, 2020

(65) Prior Publication Data
US 2021/0096391 A1    Apr. 1, 2021

(30) Foreign Application Priority Data

Sep. 27, 2019    (CN) .......................... 201910923805.6

(51) Int. Cl.
*G02B 30/54* (2020.01)
(52) U.S. Cl.
CPC .................................. *G02B 30/54* (2020.01)

(58) Field of Classification Search
CPC ................ G02B 30/54; G02B 27/0172; G02B 2027/0174; G02B 5/32; G03H 1/2205; G03H 2001/2213; G09G 3/20
USPC ........................................................ 359/462
See application file for complete search history.

(56) References Cited

U.S. PATENT DOCUMENTS

| | | | | |
|---|---|---|---|---|
| 2008/0094323 | A1* | 4/2008 | Sirmon ................. | G03B 25/02 345/83 |
| 2010/0132234 | A1* | 6/2010 | Winkler ................. | G09F 11/23 40/431 |

* cited by examiner

*Primary Examiner* — Jade R Chwasz
(74) *Attorney, Agent, or Firm* — Arent Fox LLP; Michael Fainberg

(57) ABSTRACT

A holographic display, a holographic display device and a display method thereof are provided. The holographic display includes a supporting platform including a central display area and at least one annular tiled display area arranged around the central display area; a first display screen located in the central display area, and an area formed by rotation of the first display screen around a central axis of the supporting platform covers the central display area; and a plurality of second display screens which are arranged at intervals and located in the tiled display area, and orthographic projections of two frames, perpendicular to the supporting platform, of each second display screen on the supporting platform is located on two boundaries of the tiled display area; and a quantity of the second display screens is larger than a quantity of the first display screen.

14 Claims, 8 Drawing Sheets

HOLOGRAPHIC DISPLAY, HOLOGRAPHIC DISPLAY DEVICE AND DISPLAY METHOD THEREOF

CROSS REFERENCE TO RELATED APPLICATION

This application claims priority to Chinese Patent Application No. 201910923805.6, filed with the Chinese Patent Office on Sep. 27, 2019. The entire disclosure of the above application is incorporated herein by reference.

FIELD

The present disclosure relates to the technical field of holographic display, in particular to a holographic display, a holographic display device and a display method thereof.

BACKGROUND

Compared with the flat panel LED display technology, a three-dimensional (3D) stereoscopic image display has the characteristics of large information amount and full reproduction of the three-dimensional information of an actual scene, so that a viewer can directly see the distance and depth of each object in an image from the display, thus the viewer can obtain more comprehensive and intuitive information. In the past, people usually observed three-dimensional information by means of 3D glasses. This method mainly uses the parallax principle. When the viewer watches a picture, as long as two sets of images with slightly staggered shooting positions are provided for left and right eyes respectively, causing a difference in depth of field, a set of pictures with the stereoscopic effect can be seen. Common methods to realize the parallax principle include color separation, light splitting, time sharing, grating, etc. Although the stereoscopic display technology involving glasses has a good stereoscopic display effect, it is not suitable for many occasions.

With the development of three-dimensional display technologies, the naked-eye three-dimensional display technology has broad application prospects in the fields of virtual reality technology, 3D games, 3D advertising, aerospace, nuclear technology, biomolecules, etc.

SUMMARY

Embodiments of the present disclosure provide a holographic display, a holographic display device and a display method thereof.

In a first aspect, the embodiments of the present disclosure provide a holographic display, including: a supporting platform, where the supporting platform comprising a central display area and at least one annular tiled display area arranged around the central display area; a first display screen located in the central display area, where a light emitting surface of the first display screen is perpendicular to the supporting platform, and an area formed by rotation of the first display screen around a central axis of the supporting platform covers the central display area; and a plurality of second display screens which are arranged at intervals and located in the tiled display area, wherein a light emitting surface of each of the plurality of second display screens is perpendicular to the supporting platform, and orthographic projections of two frames, perpendicular to the supporting platform, of each second display screen respectively on the supporting platform is located on two boundaries of the tiled display area where the second display screen is located; and the number of the second display screens is larger than the number of the first display screen.

In some embodiments, there are at least two annular tiled display areas, and the number of the second display screens in each tiled display area increase in sequence in a direction away from the central axis of the supporting platform.

In some embodiments, the first display screen is axisymmetric, and an axis of symmetry of the first display screen coincides with the central axis of the supporting platform.

In some embodiments, the second display screens and the first display screen are of a same specification.

In some embodiments, a distance between an outer boundary of each tiled display area and the central axis of the supporting platform is $\lambda$ times a distance between an outer boundary of the central display area and the central axis of the supporting platform; and each tiled display area comprises $\lambda$ pairs of second display screens, in one pair of second display screens, an included angle between the two second display screens is 180°, extension surfaces of the two second display screens intersect at the central axis of the supporting platform, and light emitting directions of the two second display screens are same, where $\lambda$ is an odd number greater than 1.

In some embodiments, in a same tiled display area, a position angle $\gamma$ of each second display screen is:

$$\gamma = 360° \times \frac{x}{y} - \alpha \times \frac{2x}{y}$$

where $\gamma$ represents the position angle of each second display screen in the same tiled display area, x represents a serial number of each second display screen in the tiled display area, y represents the quantity of the second display screens in the tiled display area, and $\alpha$ represents an included angle between phases during display of the holographic display.

In some embodiments, the holographic display further includes a cover plate, wherein the cover plate is positioned on a side, facing away from the supporting platform, of each display screen, and is arranged in parallel with the supporting platform.

In some embodiments, the holographic display further includes a plurality of supporting columns disposed between the cover plate and the supporting platform; and the orthographic projections of the supporting columns on the supporting platform do not overlap with orthographic projections of the display screens on the supporting platform.

In some embodiments, the holographic display further includes drive circuit boards arranged in one-to-one correspondence with the display screens; and the drive circuit boards are disposed on a side, facing away from the display screens, of the supporting platform.

In a second aspect, the embodiments of the disclosure provides a holographic display device, including the holographic display as described above, and a motor for driving the supporting platform to rotate; where a central rotating axis of the motor coincides with the central axis of the supporting platform.

In some embodiments, the holographic display device further includes a base, where the base is disposed on a side, facing away from the holographic display, of the motor.

In some embodiments, the holographic display device further includes a protective casing, where the protective casing is disposed between the cover plate and the base to surround the holographic display and the motor.

In a third aspect, the embodiments of the disclosure provides a display method of the holographic display device as described above, including: providing a driving signal for the motor to trigger the motor to drive the supporting platform to rotate according to a preset rule; and when the first display screen and the second display screens rotate to corresponding positions on the supporting platform, providing corresponding display data for the first display screen and the second display screens.

In some embodiments, refresh frequencies of the first display screen and the second display screens are same.

In some embodiments, the second display screens in a same tiled display area are refreshed simultaneously.

DETAILED DESCRIPTION OF THE EMBODIMENTS

In a single-axis rotary holographic display in the related art, the holographic display effect is realized by rotating a display screen at a high speed, adopting high-speed refreshing, and taking advantage of human persistence of vision. As voxels move around a rotating axis during imaging, the voxels are sparse outside and dense inside, and large outside and small inside. In order to ensure relatively uniform voxel density, the display range cannot be further expanded, resulting in limited size of the holographic display.

Figure 1:
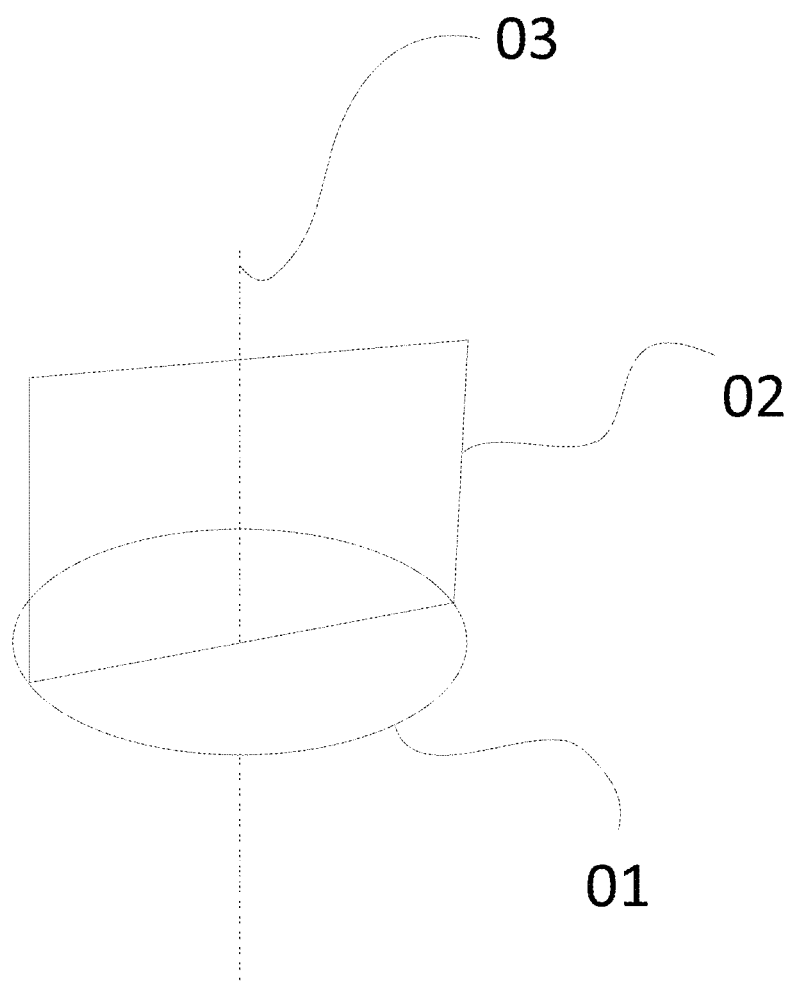
FIG. 1 is a structural diagram of a holographic display device in the related art.
Figure 2:
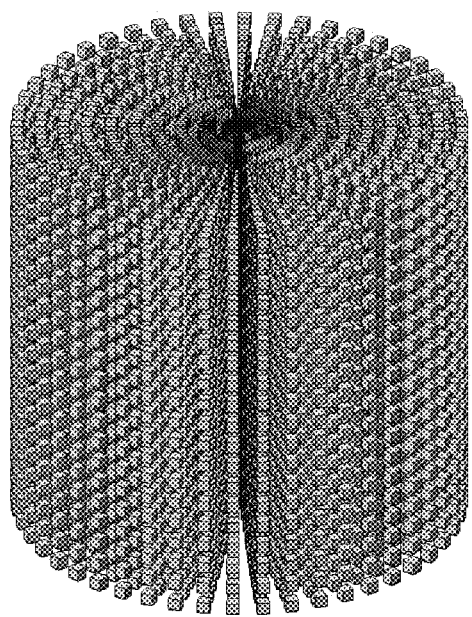
FIG. 2 is a structural diagram illustrating voxel distribution formed by the holographic display device shown in FIG. 1.
Figure 3:
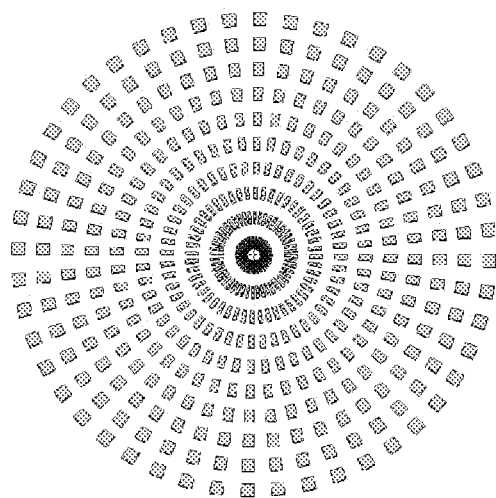
FIG. 3 is a top view of the structural diagram of voxel distribution shown in FIG. 2.

As shown in FIG. 1, a supporting structure 01 and a display screen 02 positioned on and perpendicular to the supporting structure 01 are provided. The display screen 02 rotates around a central axis 03 of the supporting structure 01 according to a preset phase under the drive of the supporting structure 01 to form a voxel distribution as shown in FIG. 2, so as to realize holographic display. As can be seen from FIGS. 2 and 3, the densities and sizes of voxels are not the same at the position close to the central axis 03 of the supporting structure 01 and at the position away from the central axis 03 of the supporting structure 01, showing that the voxels are sparse outside and dense inside, and large outside and small inside.

This kind of holographic equipment depends on the rotation of a motor to provide position characteristics. Different angular positions in space are called phases. The more phases are, the higher the angular resolution of the holographic display equipment is, and the higher the voxel density is on the premise of a fixed diameter of a holographic display. When the screen rotates to a specific phase, a specific image is displayed, and a holographic image is presented in human eyes due to persistence of vision. Therefore, when the refresh rate of a display system is fixed, in order to ensure the voxel density, the display range cannot be further expanded and the size of the holographic display is limited.

On this basis, the embodiments of the present disclosure provide a holographic display, a holographic display device and a display method thereof. In order to make the purpose, technical solution and advantages of the present disclosure more clear, the specific implementations of the holographic display, the holographic display device and the display method thereof provided by the embodiments of the present disclosure are described in detail below with reference to the accompanying drawings. It should be understood that the preferred embodiments described below are only configured to illustrate and explain the present disclosure and are not configured to limit the present disclosure. Besides, the embodiments in the present application and the features in the embodiments may be combined with each other without conflict.

The shapes and sizes of the components in the drawings do not reflect true proportions, and are only for the purpose of schematically illustrating the present disclosure.

Figure 4:
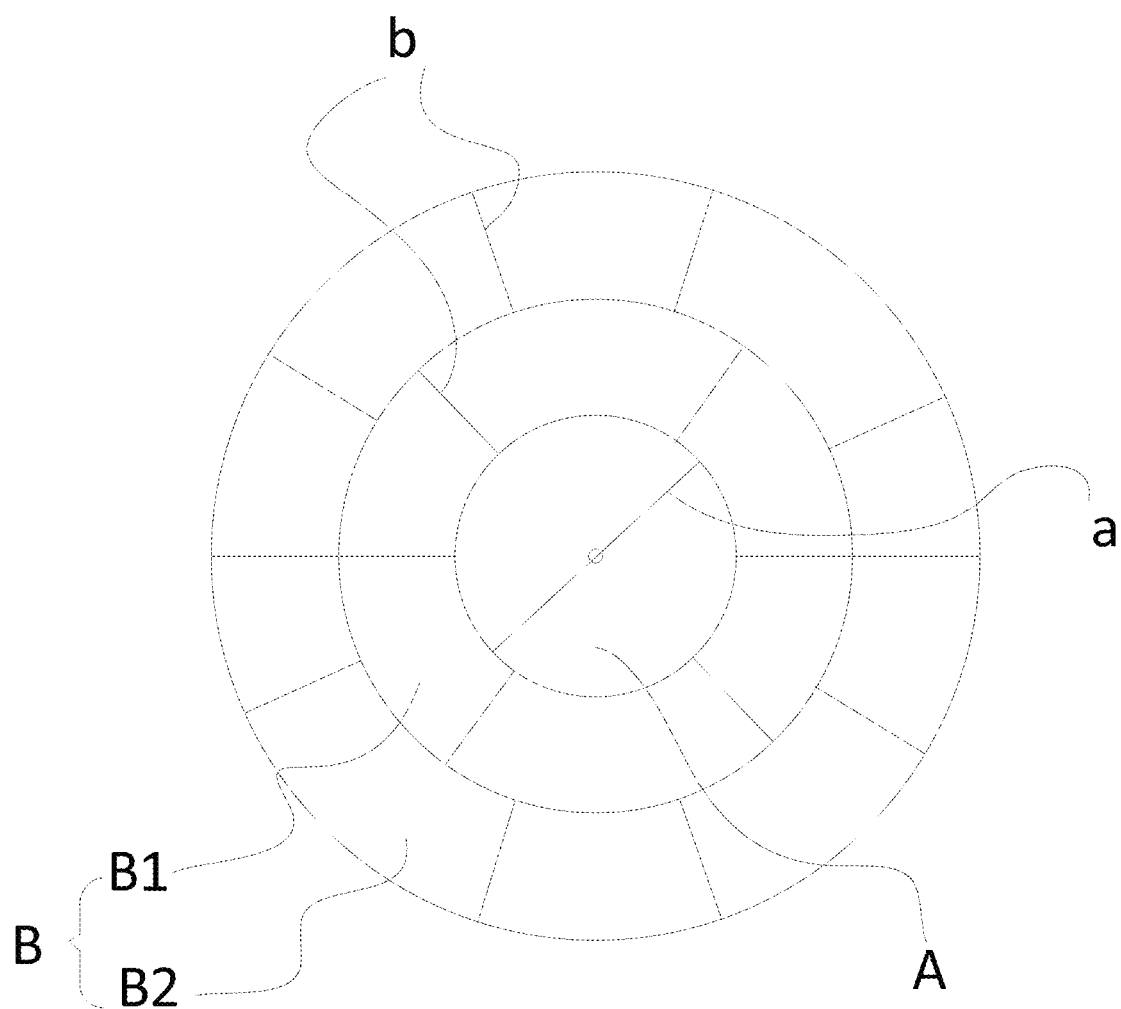
FIG. 4 is a top view of a holographic display provided by the embodiments of the present disclosure.
Figure 5:
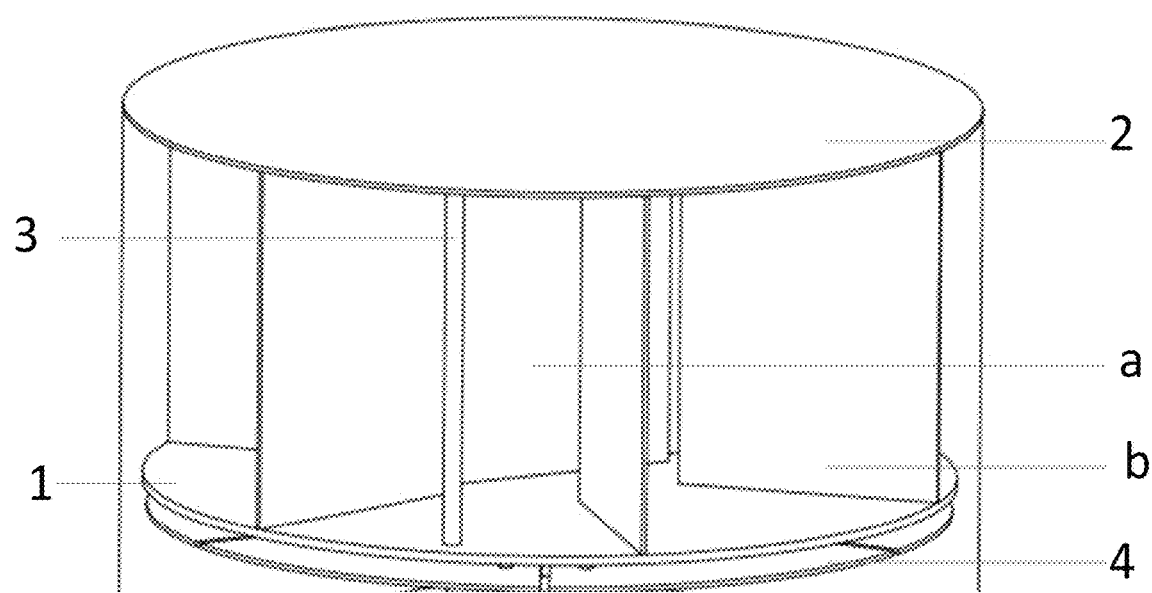
FIG. 5 is a schematic diagram of a three-dimensional structure of a holographic display provided by the embodiments of the present disclosure.

The embodiments of the present disclosure provide a holographic display, as shown in FIGS. 4 and 5, the holographic display includes a supporting platform, and the supporting platform 1 includes a central display area A and at least one annular tiled display area B arranged around the central display area A;

a first display screen a is located in the central display area A, and a light emitting surface of the first display screen a is perpendicular to the supporting platform 1, and an area formed by the rotation of the first display screen a around a central axis of the supporting platform 1 covers the central display area A;

a plurality of second display screens b which are arranged at intervals are located in each tiled display area B, a light emitting surface of each second display screen b is perpendicular to the supporting platform 1, and orthographic projections of two frames, perpendicular to the supporting platform 1, of each second display screen b on the supporting platform 1 respectively locates on two boundaries of the tiled display area B where the second display screen b is positioned; and the number of the second display screens b is larger than the number of the first display screen a.

In some embodiments, there are at least two tiled display areas B, and the numbers of the second display screens b in each tiled display areas B increase in sequence in the direction away from the central axis of the supporting platform 1.

In some embodiments, in the holographic display provided by the embodiments of the present disclosure, as shown in FIG. 4, the holographic display includes a central display area A and at least one tiled display area B, where the structural diagram in FIG. 4 is illustrated by taking two tiled display areas B (a first tiled display area B1 and a second tiled display area B2) as an example, and the central display area A, the first tiled display area B1 and the second tiled display area B2 are sequentially arranged from the central axis of the supporting platform 1 to the tiled display areas B.

The central display area is a reference display area, which includes one first display screen therein. The refresh frequency of the first display screen is H (there is an upper limit value). The space is divided into N phases. The larger the phase number N is, the smaller the voxel spacing is, and the finer the image quality is. The phase frequency W=H/N (when W≥24 fps, the animation is continuous and human eyes cannot detect buffering). The larger the phase frequency value is, and the higher the picture continuity is.

In some embodiments, the spacing between pixels in the first display screen is d. In order to ensure uniform display, the arc length spacing between voxels at the edge of the central display area (L=π*D/N) and the spacing between the pixels of the first display screen need to satisfy the following relationship:

d≥L=π*D/N=π*D/(H/W), i.e., D≤d*H/(πW), where d is the parameter of a module itself and is a fixed value; due to technical limitations, the refresh rate H has an upper limit value, and W is a whole machine parameter and is a fixed value; therefore, there is an upper limit value for the diameter D of the central display area, and exceeding the upper limit value will affect the display uniformity.

Therefore, in order to increase the size of the display area of the holographic display, tiled display areas are added at the periphery of the central display area, and the voxels in each display area of the holographic display are made uniform by adjusting the number of the second display screens arranged in the tiled display areas, thereby improving the display quality.

In some embodiments, in the holographic display provided by the embodiments of the present disclosure, the first display screen is axisymmetric, and an axis of symmetry of the first display screen coincides with the central axis of the supporting platform.

In some embodiments, in the holographic display provided by the embodiments of the present disclosure, the first display screen may be only disposed on one side of the central axis of the supporting platform, but this arrangement may cause uneven stress on both sides of the central axis of the supporting platform during rotating display. By arranging one first display screen with axial symmetry in the central display area, stable stress can be guaranteed, and the problem of dark lines at splices caused by the arrangement of a plurality of display screens can be avoided.

In some embodiments, in the holographic display provided by the embodiments of the present disclosure, the second display screens and the first display screen are of the same specification.

In some embodiments, in the holographic display provided by the embodiments of the present disclosure, the first display screen and the second display screens are of the same specification, which means technically, the first display screen and the second display screens can be designed with one specification to reduce design parameters; in addition, when the first display screen and the second display screens are driven for display, the uniformity of voxels can be ensured by making the refresh frequencies of the first display screen and the second display screens same, avoiding the setting of a plurality of refresh frequency parameters and reducing the design of driving data.

In some embodiments, in the holographic display provided by the embodiments of the present disclosure, the distance between an outer boundary of each tiled display area and the central axis of the supporting platform is λ times the distance between an outer boundary of the central display area and the central axis of the supporting platform; and each tiled display area includes λ pairs of the second display screens, in one pair of the second display screens, the included angle between the two second display screens is 180°, extension surfaces of the two second display screens intersect at the central axis of the supporting platform, and the directions of light emitting surfaces of the two second display screens are the same, here λ is an odd number greater than 1.

In some embodiments, in the holographic display provided by the embodiments of the present disclosure, when the first display screen is symmetrical with the central axis of the support platform as an axis of symmetry and the specifications of the first display screen and the second display screens are the same, the distance between the outer boundary of each tiled display area and the central axis is 3, 5, 7, 9 . . . times the distance between the central display area and the central axis in sequence in the direction from the central display area to the tiled display area according to the arrangement mode of the central display area and the tiled display areas.

In addition, in order to ensure that the arc length spacing between voxels at the edge of each tiled display area is equal to the arc length spacing between voxels at the edge of the central display area, the number of the second display screens in each tiled display area is 2λ.

Figure 6:
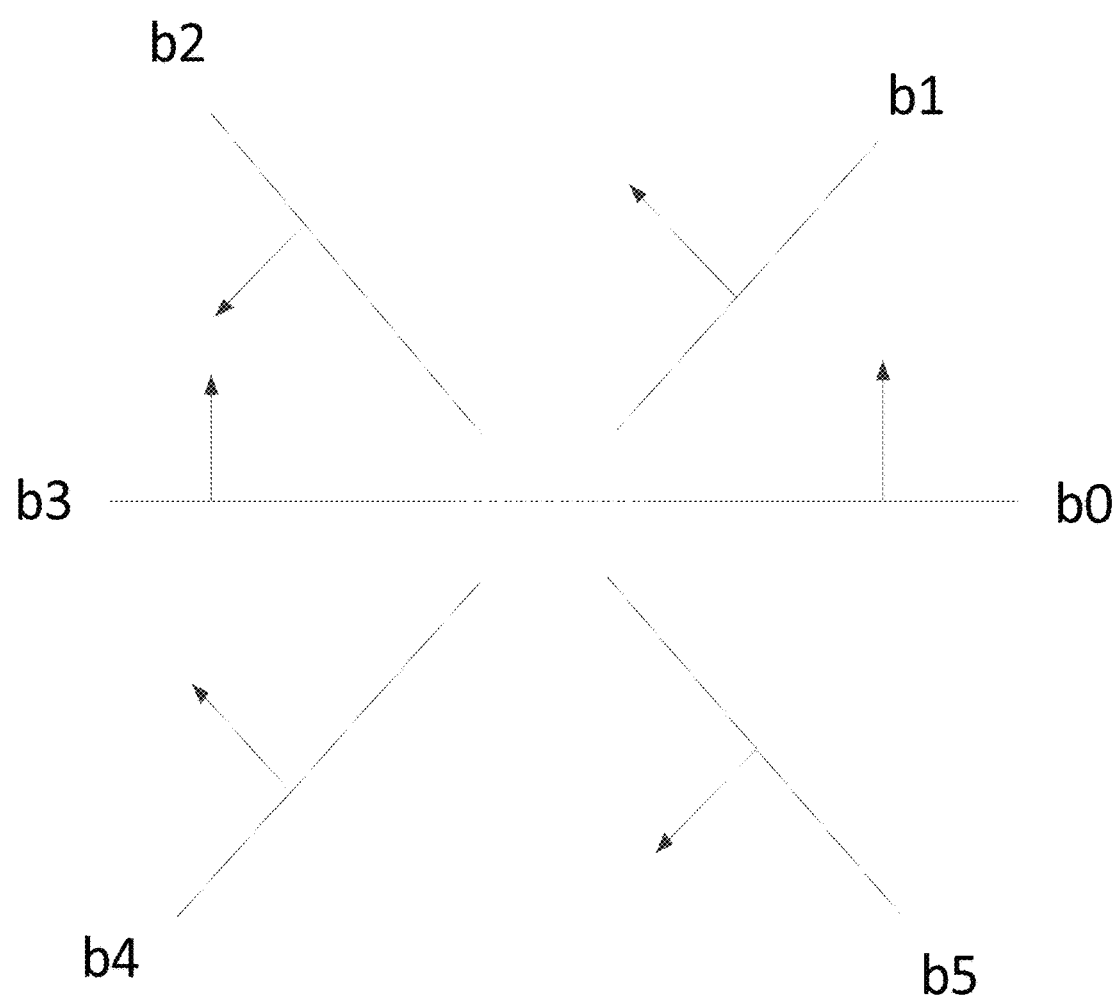
FIG. 6 is a structural diagram illustrating the positional relationship and display orientations of second display screens in a tiled display area provided by the embodiments of the present disclosure.

FIG. 6 shows a tiled display area adjacent to the central display area, and the tiled display area includes six second display screens, where in the six second display screens, two second display screens with the same light emitting direction are a pair, that is, b0 and b3 are a pair, b1 and b4 are a pair, and b2 and b5 are a pair.

Figure 7:
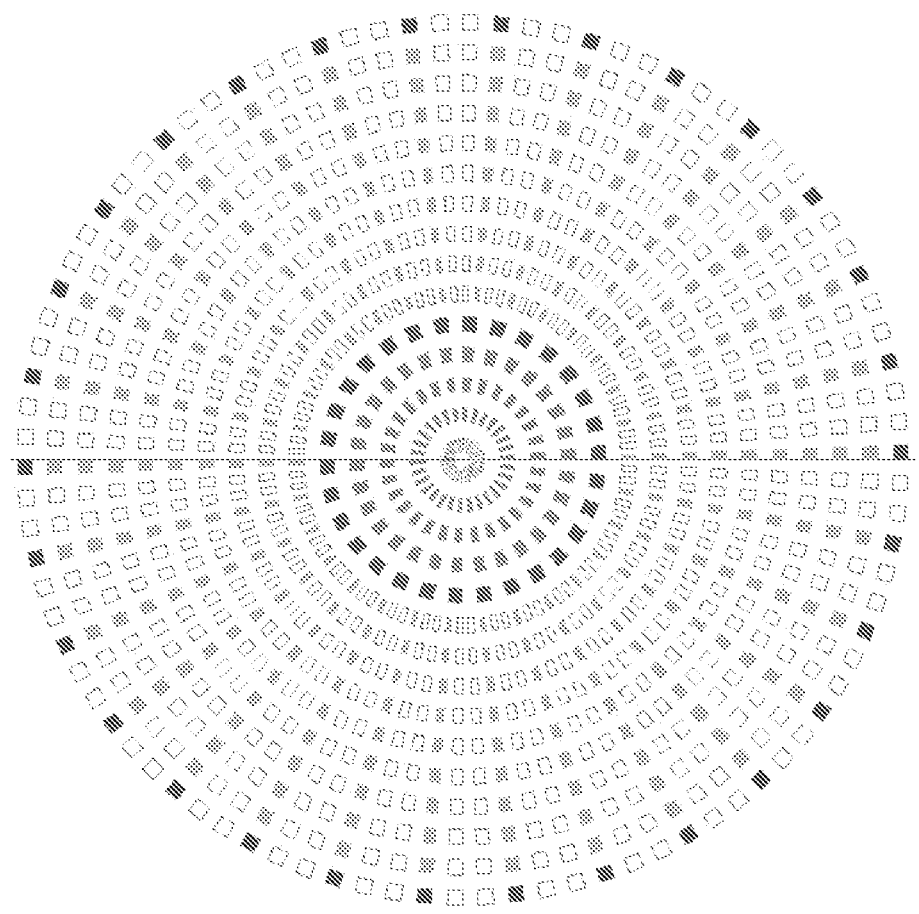
FIG. 7 is a structural diagram illustrating voxel distribution during display by the display screen 0 and the display screen 3 in FIG. 6.

The voxel structure diagram shown in FIG. 7 is a diagram when b0 and b3 display a first voxel. It can be seen that the arc length spacing between voxels at the edge of each tiled display area (the distance between adjacent black boxes at the boundary of the tiled display area) is significantly smaller than the arc length spacing between voxels of the central display area (the distance between adjacent black boxes at the boundary of the central display area).

Figure 8:
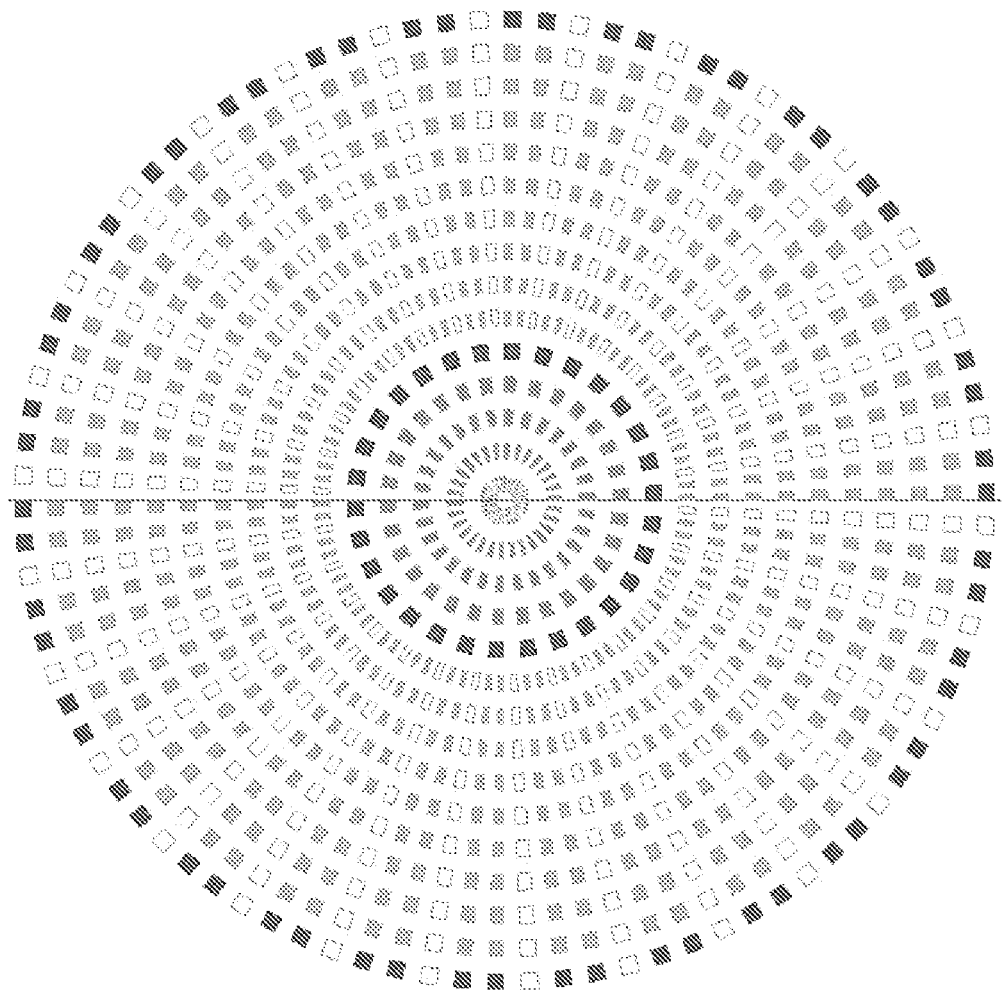
FIG. 8 is a structural diagram illustrating voxel distribution during display by the display screen 0, the display screen 3, the display screen 1 and the display screen 4 in FIG. 6.

In the voxel structure diagram shown in FIG. 8, b0 and b3 show the first voxel and b1 and b4 show a second voxel. By comparing the voxel structure diagrams in FIG. 8 and FIG. 7, it can be clearly seen that after adding the display screens b1 and b4, the arc length spacing between voxels at the edge of each tiled display area is significantly reduced compared with that in FIG. 7, and is closer to the arc length spacing between voxels in a key display area.

Figure 9:
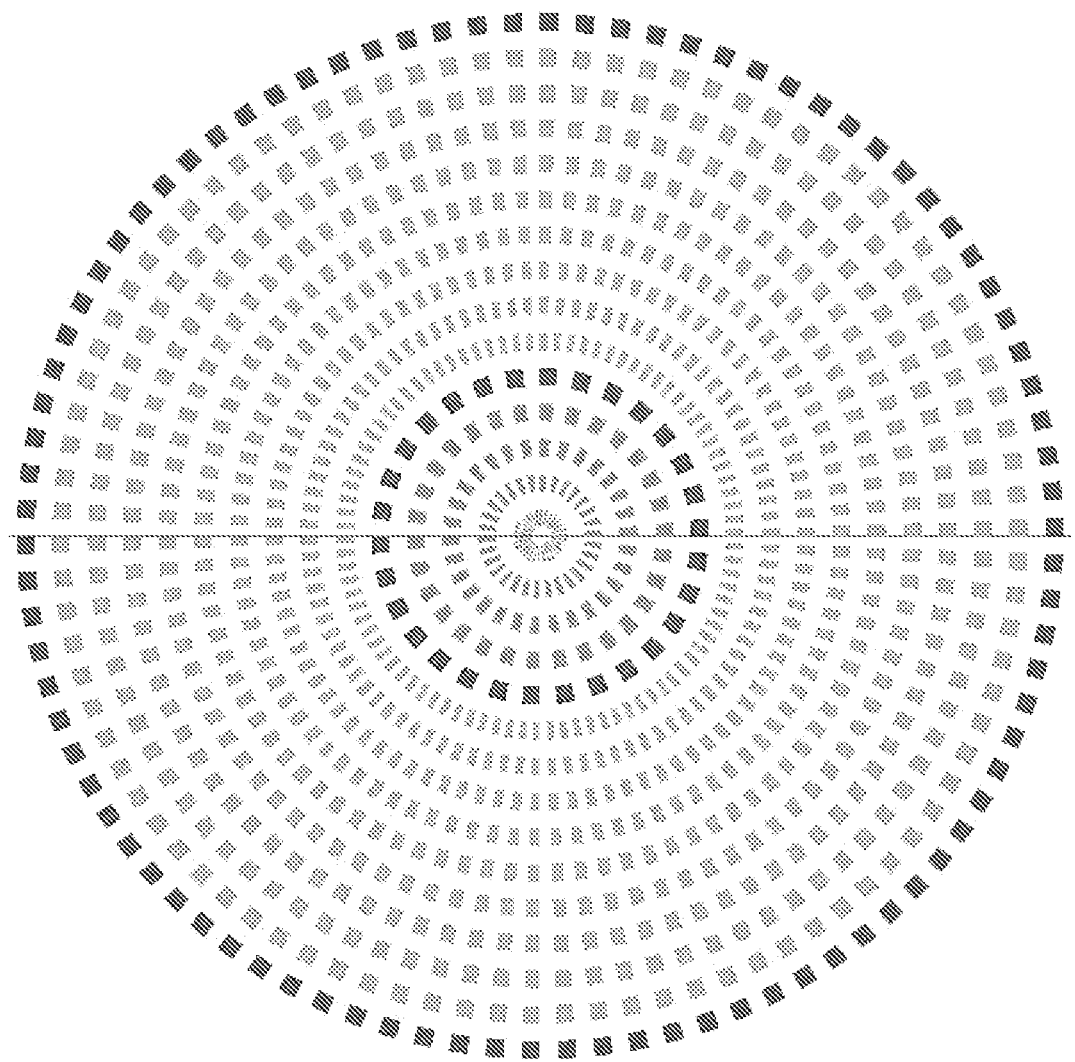
FIG. 9 is a structural diagram illustrating voxel distribution during display by all the display screens in FIG. 6.

In the voxel structure diagram shown in FIG. 9, display screens b3 and b5 are added on the basis of FIG. 8 to display a third voxel. As can be seen from FIG. 9, the arc length spacing between voxels at the edge of each tiled display area (the distance between adjacent black boxes at the boundary of the tiled display area) is equal to the arc length spacing between voxels of the central display area (the distance between adjacent black boxes at the boundary of the central display area).

In summary, by setting the number of the second display screens in each tiled display area, the voxel density in the tiled display areas can be made equal to that in the central display area, so as to improve the display quality.

In some embodiments, the directions of the light emitting surfaces of the second display screens in one pair are set to be the same, so as to enable 360° display of the holographic display, that is, when the support platform rotates, images can be displayed at all viewing angles, thus avoiding blank display areas.

It should be noted that this distribution mode is based on the fact that the first display screen in the central display area is symmetrical about the central axis, the display area of the holographic display is cylindrical, so during rotation, half of the screen rotates counterclockwise and the other half rotates clockwise, which can provide light in an all-around manner.

In some embodiments, in the holographic display provided by the embodiments of the present disclosure, in the same tiled display area, the position angle γ of each second display screen is:

$$\gamma = 360° \times \frac{x}{y} - \alpha \times \frac{2x}{y};$$

here γ represents the position angle of each second display screen in the same tiled display area, x represents the serial number of each second display screen in the tiled display area, y represents the number of the second display screens in the tiled display area, and a represents the included angle between phases during display of the holographic display.

It should be noted that $$360° \times \frac{x}{y}$$

means dividing the 360° space of the holographic display into equal parts, this arrangement can make the second display screens evenly distributed, with small rotation eccentricity and smooth rotation. In addition, this arrangement allows similar spacing between the second display screens in each tiled display area, and the lowest probability of mutual occlusion of light emission between the second display screens.

In some embodiments, in the holographic display provided by the embodiments of the present disclosure, as shown in FIG. 5, a cover plate 2 is further provided, where the cover plate 2 is positioned on the side, facing away from the supporting platform 1, of each display screen, and is arranged in parallel with the supporting platform 1.

The cover plate can play a certain role in fixing and protecting each display screen positioned on a supporting structure, and facilitates the arrangement of a packaging structure around the holographic display.

In some embodiments, in the holographic display provided by the embodiments of the present disclosure, as shown in FIG. 5, a plurality of supporting columns 3 located between the cover plate 2 and the supporting platform 1 are further provided; and the orthographic projections of the supporting columns 3 on the supporting platform 1 do not overlap with the orthographic projections of the display screens (a or b) on the supporting platform 1.

In some embodiments, in the holographic display provided by the embodiments of the present disclosure, the supporting columns provided between the cover plate and the supporting platform can disperse the supporting force for the display screens positioned on the supporting platform and maintain the stability of the display space of the holographic display.

In some embodiments, in the holographic display provided by the embodiments of the present disclosure, as shown in FIG. 5, drive circuit boards 4 arranged in one-to-one correspondence with the display screens are further provided; and the drive circuit boards 4 are disposed on the side, facing away from the display screens, of the supporting platform 1.

Each drive circuit board provides a drive signal for the corresponding display screen, and during display of the holographic display, each drive circuit board rotates along with the supporting platform, and the side, facing away from the supporting platform, of the drive circuit board further includes a rotating conductive structure, a signal input end of the rotating conductive structure is fixed, and a signal output end of the rotating conductive structure is electrically connected with the drive circuit board and rotates along with the drive circuit board.

Figure 10:
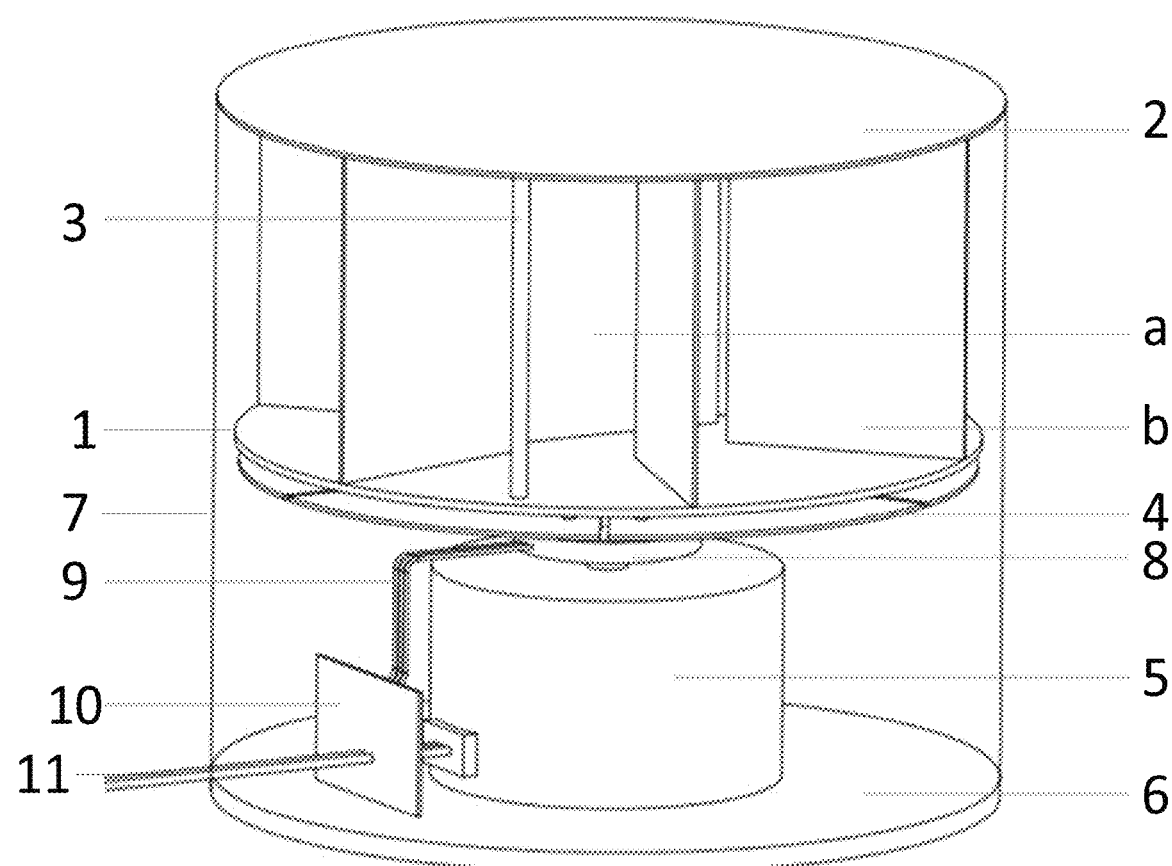
FIG. 10 is a structural diagram of a holographic display device provided by the embodiments of the present disclosure.

Based on the same inventive concept, as shown in FIG. 10, the embodiments of the present disclosure further provide a holographic display device, including the holographic display according to any embodiment mentioned above, and a motor 5 for driving the supporting platform 1 to rotate;

where a central rotating shaft of the motor 5 coincides with the central axis of the supporting platform 1.

In some embodiments, in the holographic display device provided by the embodiments of the present disclosure, as shown in FIG. 10, a base 6 is further provided, and the base 6 is located at the side, facing away from the holographic display, of the motor 5.

In some embodiments, in the holographic display device provided by the embodiments of the present disclosure, as shown in FIG. 10, a protective casing 7 is further provided, and the protective casing 7 is located between the cover plate 2 and the base 6 to surround the holographic display and the motor 5.

In some embodiments, in the holographic display device provided by the embodiments of the present disclosure, the supporting platform is driven to rotate by the motor, and components such as the holographic display and the motor can be supported and protected by the base and the protective casing.

Of course, as shown in FIG. 10, in addition to the above components, the holographic display device also includes a display input power line 9 electrically connected to the rotating conductive structure 8, a motor drive circuit board 10 for driving the motor 5 to rotate according to a preset rule, and an input power line 11 electrically connected to the motor drive circuit board 10.

The holographic display device has all the advantages of the holographic display provided by the above embodiments, so the holographic display device can be implemented with reference to the above embodiments of the holographic display, which will not be repeated here.

Based on the same inventive concept, the embodiments of the present disclosure further provide a display method of a holographic display device, including:

providing a driving signal to the motor to trigger the motor to drive the supporting platform to rotate according to a preset rule; and providing corresponding display data to the first display screen and the second display screens, when the first display screen and the second display screens rotate to corresponding positions on the supporting platform.

The refresh frequencies of the first display screen and the second display screens are the same, that is, the refresh frequencies of the display screens located in the central display area and the tiled display areas are the same. This is because the display screens in the central display area and the tiled display areas are of the same specification, and by making the refresh frequencies of the first display screen and the second display screens same, the voxel densities of the central display area and the tiled display areas can be ensured to be the same, and the display uniformity can be ensured.

In some embodiments, in the display method of the holographic display device provided by the embodiments of the present disclosure, the second display screens in the same tiled display area are refreshed simultaneously.

In some embodiments, in the display method of the holographic display device provided by the embodiments of the present disclosure, the second display screens in the same tiled display area are refreshed simultaneously to ensure that the displays of different frames do not coincide during display.

It should be noted that in the display method of the holographic display device provided by the embodiments of the present disclosure, the second display screens in the same tiled display area are refreshed synchronously, and the display screens in different display areas may not be refreshed synchronously as long as the refresh frequencies are the same.

The embodiments of the present disclosure provide a holographic display, a holographic display device and a display method thereof. The holographic display includes: a supporting platform, where the supporting platform includes a central display area and at least one annular tiled display area arranged around the central display area; the central display area includes a first display screen, a light emitting surface of the first display screen is perpendicular to the supporting platform, and an area formed by the rotation of the first display screen around a central axis of the supporting platform covers the central display area; each tiled display area includes a plurality of second display screens which are arranged at intervals, a light emitting surface of each second display screen is perpendicular to the supporting platform, and the orthographic projections of two frames, perpendicular to the supporting platform 1, of each second display screen b on the supporting platform 1 respectively locates on two boundaries of the tiled display area where the second display screen is positioned; and the number of the second display screens is larger than the number of the first display screen, and the the number of the second display screens in the tiled display areas increase in sequence in the direction away from the central axis of the supporting platform. By arranging the central display area and the tiled display areas on the supporting platform and increasing the number of the second display screens arranged in the tiled display areas, the voxels in the tiled display areas and the voxels in the central display area are ensured to be relatively uniform, so that the size of the display area of the holographic display can be effectively increased.

Obviously, those skilled in the art can make various changes and modifications to the present disclosure without departing from the spirit and scope of the present disclosure. Thus, the present disclosure is also intended to include such modifications and variations if they fall within the scope of the claims of the present disclosure and their equivalents.

The invention claimed is:

1. A holographic display, comprising:
a supporting platform, wherein the supporting platform comprising a central display area and at least one annular tiled display area arranged around the central display area;
one first display screen located in the central display area, wherein a light emitting surface of the first display screen is perpendicular to the supporting platform, and an area formed by rotation of the first display screen around a central axis of the supporting platform covers the central display area; and
a plurality of second display screens which are arranged at intervals and located in the tiled display area, wherein a light emitting surface of each of the plurality of second display screens is perpendicular to the supporting platform, and orthographic projections of two frames, perpendicular to the supporting platform, of each second display screen respectively on the supporting platform is located on two boundaries of the tiled display area where the second display screen is located; and
a quantity of the second display screens is larger than a quantity of the first display screen;
wherein a distance between an outer boundary of each tiled display area and the central axis of the supporting platform is $\lambda$ times a distance between an outer boundary of the central display area and the central axis of the supporting platform; and each tiled display area comprises $\lambda$ pairs of second display screens, in one pair of second display screens, an included angle between the two second display screens is 180°, extension surfaces of the two second display screens intersect at the central axis of the supporting platform, and light emitting directions of the two second display screens are same, wherein $\lambda$ is an odd number greater than 1.

2. The holographic display according to claim 1, wherein there are at least two annular tiled display areas, and a quantity of the second display screens in each tiled display area increase in sequence in a direction away from the central axis of the supporting platform.

3. The holographic display according to claim 2, wherein the first display screen is axisymmetric, and an axis of symmetry of the first display screen coincides with the central axis of the supporting platform.

4. The holographic display according to claim 3, wherein the second display screens and the first display screen are of a same specification.

5. The holographic display according to claim 1, wherein in a same tiled display area, a position angle $\gamma$ of each second display screen is:

$$\gamma = 360° \times \frac{x}{y} - \alpha \times \frac{2x}{y}$$

wherein $\gamma$ represents the position angle of each second display screen in the same tiled display area, x represents a serial number of each second display screen in the tiled display area, y represents the quantity of the second display screens in the tiled display area, and $\alpha$ represents an included angle between phases during display of the holographic display.

6. The holographic display according to claim 1, further comprising a cover plate, wherein the cover plate is positioned on a side, facing away from the supporting platform, of each display screen, and is arranged in parallel with the supporting platform.

7. The holographic display according to claim 6, further comprising a plurality of supporting columns disposed between the cover plate and the supporting platform; and orthographic projections of the supporting columns on the supporting platform do not overlap with orthographic projections of the display screens on the supporting platform.

8. The holographic display according to claim 1, further comprising drive circuit boards arranged in one-to-one correspondence with the display screens; and the drive circuit boards are disposed on a side, facing away from the display screens, of the supporting platform.

9. A holographic display device, comprising the holographic display according to claim 1, and a motor for driving the supporting platform to rotate; wherein a central rotating axis of the motor coincides with the central axis of the supporting platform.

10. The holographic display device according to claim 9, further comprising a base, wherein the base is disposed on a side, facing away from the holographic display, of the motor.

11. The holographic display device according to claim 10, further comprising a protective casing, wherein the protective casing is disposed between the cover plate and the base to surround the holographic display and the motor.

12. The display method of the holographic display device according to claim 10, wherein refresh frequencies of the first display screen and the second display screens are same.

13. The display method of the holographic display device according to claim 10, wherein the second display screens in a same tiled display area are refreshed simultaneously.

14. A display method of the holographic display device according to claim 9, comprising:

providing a driving signal for the motor to trigger the motor to drive the supporting platform to rotate according to a preset rule; and when the first display screen and the second display screens rotate to corresponding positions on the supporting platform, providing corresponding display data for the first display screen and the second display screens.

* * * * *